US010667038B2

(12) United States Patent
Agashe et al.

(10) Patent No.: US 10,667,038 B2
(45) Date of Patent: May 26, 2020

(54) MEMS MIRCOPHONE WITH INCREASED BACK VOLUME

(71) Applicant: Apple Inc., Cupertino, CA (US)

(72) Inventors: Janhavi S. Agashe, San Jose, CA (US); Jae H. Lee, Palo Alto, CA (US); Ruchir M. Dave, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/499,784

(22) Filed: Apr. 27, 2017

(65) Prior Publication Data

US 2018/0160218 A1 Jun. 7, 2018

Related U.S. Application Data

(60) Provisional application No. 62/431,295, filed on Dec. 7, 2016.

(51) Int. Cl.
*H04R 3/00* (2006.01)
*H04R 1/28* (2006.01)
(Continued)

(52) U.S. Cl.
CPC ......... *H04R 1/2807* (2013.01); *H04R 19/005* (2013.01); *H04R 19/02* (2013.01); *H04R 31/00* (2013.01)

(58) Field of Classification Search
CPC .. H04R 1/2807; H04R 1/2838; H04R 1/2846; H04R 1/2869; H04R 1/2876; H04R 1/22;
(Continued)

(56) References Cited

U.S. PATENT DOCUMENTS 3,903,660 A 9/1975 Akins
3,909,531 A 9/1975 Plummer
(Continued)

FOREIGN PATENT DOCUMENTS

AU 2016289385 A1 1/2018
CN 101815235 8/2010
(Continued)

OTHER PUBLICATIONS

Sebaslian Anthony "Zeolite thermal storage retains heat indefinitly, absorbs four time smore heat than water", https://www.extremetech.com/extreme/130523-zeolite-thermal-storage-retains-heat-indefinitely-absorbs-four-times-more-heat-than-water, pp. 1-2, Jun. 6, 2012. (Year: 2012).*
(Continued)

*Primary Examiner* — Leshui Zhang
(74) *Attorney, Agent, or Firm* — Womble Bond Dickinson (US) LLP

(57) ABSTRACT

A micro-electro-mechanical system (MEMS) microphone assembly including an enclosure having a top side and a bottom side that define a first chamber having a first volume and an acoustic inlet port formed through one of the top side or the bottom side. The assembly further including a MEMS microphone mounted within the first chamber, the MEMS microphone defining a second chamber having a second volume and a diaphragm having a first side interfacing with the first chamber and a second side interfacing with the second chamber. The assembly also including an acoustically absorbent material within one of the first chamber or the second chamber, the acoustically absorbent material to cause a simulated acoustic enlargement of the first volume or the second volume, respectively.

14 Claims, 4 Drawing Sheets

(51) Int. Cl.

| | |
|---|---|
| ***H04R 19/02*** | (2006.01) |
| ***H04R 31/00*** | (2006.01) |
| ***H04R 19/00*** | (2006.01) |

(58) Field of Classification Search

CPC ........ H04R 1/222; H04R 1/245; H04R 1/265; H04R 1/28; H04R 19/04; H04R 31/00

USPC .......... 381/66, 91, 92, 93, 95, 111–115, 151, 381/338, 351, 354, 355, 356, 357, 358, 381/360, 368; 181/158, 242, 198, 222, 181/224, 252, 256, 284; 700/94

See application file for complete search history.

(56) References Cited

U.S. PATENT DOCUMENTS

| | | | | |
|---|---|---|---|---|
| 4,101,736 | A | 7/1978 | Czerwinski | |
| 4,279,632 | A | 7/1981 | Frosch et al. | |
| 4,445,730 | A | 5/1984 | Cross | |
| 4,628,067 | A | 12/1986 | Chen et al. | |
| 4,637,990 | A | 1/1987 | Torobin | |
| 4,657,108 | A | 4/1987 | Ward | |
| 4,671,909 | A | 6/1987 | Torobin | |
| 4,687,672 | A | 8/1987 | Vitkovsky | |
| 5,552,035 | A | 9/1996 | Potter et al. | |
| 6,210,625 | B1 | 4/2001 | Matsushita et al. | |
| 6,327,567 | B1 | 12/2001 | Willehadson et al. | |
| 6,423,658 | B1 | 7/2002 | Thonnelier et al. | |
| 7,233,679 | B2 | 7/2007 | Muthuswamy et al. | |
| 7,463,747 | B2 | 12/2008 | Kuze et al. | |
| 7,743,880 | B2 | 6/2010 | Matsumura et al. | |
| 7,957,541 | B2 | 6/2011 | Edgren et al. | |
| 7,974,423 | B2 | 7/2011 | Matsumura et al. | |
| 8,184,826 | B2 | 5/2012 | Matsumura et al. | |
| 8,184,845 | B2 | 5/2012 | Leidl et al. | |
| 8,238,595 | B2 | 8/2012 | Horowitz et al. | |
| 8,249,233 | B2 | 8/2012 | Loupia et al. | |
| 8,325,951 | B2 | 12/2012 | Wang | |
| 8,472,648 | B2 | 6/2013 | Wang et al. | |
| 8,565,463 | B2 | 10/2013 | Saiki et al. | |
| 8,649,506 | B2 | 2/2014 | Dinh et al. | |
| 8,687,836 | B2 | 4/2014 | Lin | |
| 8,767,998 | B2 | 7/2014 | Imamura et al. | |
| 8,794,373 | B1 | 8/2014 | Lin | |
| 8,848,960 | B2 | 9/2014 | Kamazaki | |
| 8,879,767 | B2 | 11/2014 | Wickstrom | |
| 9,099,073 | B2 | 8/2015 | Papakyriacou et al. | |
| 9,337,790 | B2 | 5/2016 | Hetherington et al. | |
| 9,380,377 | B2 * | 6/2016 | Jingming ................. | H04R 1/02 |
| 9,615,165 | B2 | 4/2017 | Herold et al. | |
| 9,635,455 | B2 | 4/2017 | Schöffmann et al. | |
| 9,712,913 | B2 | 7/2017 | Lembacher et al. | |
| 9,723,400 | B2 | 8/2017 | Herold et al. | |
| 2007/0127760 | A1 | 6/2007 | Saiki et al. | |
| 2007/0165895 | A1 | 7/2007 | Matsumura et al. | |
| 2007/0286449 | A1 | 12/2007 | Matsumura et al. | |
| 2008/0135327 | A1 | 6/2008 | Matsumura et al. | |
| 2008/0170737 | A1 | 7/2008 | Saiki et al. | |
| 2008/0260131 | A1 | 10/2008 | Akesson | |
| 2008/0310663 | A1 * | 12/2008 | Shirasaka ............ | H04R 19/016 381/355 |
| 2009/0245562 | A1 | 10/2009 | Saiki et al. | |
| 2010/0196213 | A1 | 8/2010 | Lutz et al. | |
| 2010/0246877 | A1 * | 9/2010 | Wang ................... | H04R 19/005 381/361 |
| 2011/0038495 | A1 * | 2/2011 | Jeong ..................... | H04R 17/00 381/190 |
| 2011/0085690 | A1 | 4/2011 | Yamazaki | |
| 2011/0255259 | A1 * | 10/2011 | Weber ................... | H04M 1/026 361/807 |
| 2012/0027243 | A1 | 2/2012 | Imamura et al. | |
| 2012/0045078 | A1 * | 2/2012 | Lander .................. | B81B 7/0048 381/174 |
| 2012/0288130 | A1 * | 11/2012 | Dehe ...................... | H04R 19/04 381/353 |
| 2013/0170687 | A1 * | 7/2013 | Papakyriacou .......... | B01J 20/18 381/338 |
| 2013/0308812 | A1 | 11/2013 | Shen | |
| 2013/0341118 | A1 | 12/2013 | Papakyriacou et al. | |
| 2014/0037119 | A1 | 2/2014 | Yuasa | |
| 2014/0348349 | A1 | 11/2014 | Nagaoka | |
| 2016/0127821 | A1 | 5/2016 | Bay | |
| 2016/0309254 | A1 * | 10/2016 | Lembacher .............. | H04R 1/28 |
| 2016/0345090 | A1 | 11/2016 | Wilk et al. | |
| 2017/0013350 | A1 | 1/2017 | Sauer et al. | |
| 2017/0064438 | A1 | 3/2017 | Wilk et al. | |
| 2017/0208386 | A1 | 7/2017 | Kang et al. | |
| 2018/0048951 | A1 * | 2/2018 | Zheng ...................... | H04R 1/04 |

FOREIGN PATENT DOCUMENTS

| | | | | | |
|---|---|---|---|---|---|
| CN | 104822118 | A | * | 8/2015 | ............... H04R 1/04 |
| CN | 106488365 | A | | 3/2017 | |
| CN | 107592973 | A | | 1/2018 | |
| CN | 108025283 | A | | 6/2018 | |
| DE | 112016003091 | | | 5/2018 | |
| EP | 0197776 | | | 10/1986 | |
| EP | 1048345 | | | 11/2000 | |
| EP | 1868410 | A1 | | 12/2007 | |
| EP | 2003924 | A1 | | 12/2008 | |
| FR | 2756196 | | | 5/1998 | |
| GB | 2540160 | | | 1/2017 | |
| JP | H07144913 | | | 6/1995 | |
| JP | H111318 | | | 1/1999 | |
| JP | 2004089774 | | | 3/2004 | |
| JP | 2007288712 | A | | 11/2007 | |
| JP | 2008533754 | | | 9/2008 | |
| KR | 10-2014-0144994 | | * | 2/2016 | ............ H04R 19/04 |
| KR | 10-2018-0054564 | A | | 5/2018 | |
| WO | WO-1995018675 | | | 7/1995 | |
| WO | WO 2003/049849 | | | 6/2003 | |
| WO | WO-03049849 | | | 6/2003 | |
| WO | WO-2006103404 | | | 10/2006 | |
| WO | WO-2008051904 | | | 5/2008 | |
| WO | WO2006/106854 | A1 | | 9/2008 | |
| WO | WO2012/025874 | A1 | | 3/2012 | |
| WO | WO2016/186717 | A1 | | 11/2016 | |
| WO | WO2017007644 | A1 | | 1/2017 | |

OTHER PUBLICATIONS

Nautilus Capital Corporation, International Search Report and Written Opinion, dated Oct. 28, 2016, Application No. PCT/US2016/039911.

"Standard Test Method for Attrition and Abrasion of Catalysts and Catalyst Carriers", ASTM International: D4058-96., (Aug. 1, 2011), pp. 1-3.

Donchev, "Controlling Porosity and Pore Size Distribution in Green Ceramics Bodies via Freeze-Casting Method", Ph.D. Thesis, Martin-Luther-Universitaet Halle-Wittenberg, (Aug. 18, 2005), 144 pages.

Johnson, D. A., et al., "Freezing and Shattering of Supercooled Water Drops", Quarterly Journal of the Royal Meteorological Society, (Jan. 1, 1975), pp. 468-482.

Juergen, Sauer, et al., United Kingdom Patent Office Combined Search and Examination Report (dated Jul. 26, 2016), Application No. GB1600709.8, Filed Jan. 14, 2016, 5 pages.

Kalipcilar, H., et al., "Synthesis of Submicron Silicate-1 Crystals from Clear Solutions", Crystal Research and Technology, vol. 35, No. 8, (Jan. 1, 2000), pp. 933-942.

Krasii, B. V., et al., "Comparison of Mechanical Strength of Reforming Catalysts of Different Geometry", Catalysts in Industry, vol. 1, No. 4, (Jan. 1, 2009), pp. 364-366.

Mandal, Biman B., et al., "Laminar Silk Scaffolds for Aligned Tissue Fabrication", Macromolecular Bioscience vol. 13.1, (Aug. 10, 2013), pp. 1-19.

Sakai, Takeshi, et al., "Production of Uniform Droplets by Longitudinal Vibration of Audio Frequency", Journal of Chemical Engineering of Japan vol. 13.4, (Jan. 1, 1980), pp. 263-268.

Takahashi, Chuji, "Deformations of Frozen Water Drops and Their

(56) References Cited

OTHER PUBLICATIONS

Frequencies", Journal of Meteorological Society of Japan, vol. 53, No. 6 (Dec. 1, 1975), pp. 402-411.

* cited by examiner

MEMS MIRCOPHONE WITH INCREASED BACK VOLUME

CROSS-REFERENCE TO RELATED APPLICATION

This application claims the benefit of the earlier filing date of U.S. Provisional Patent Application No. 62/431,295, filed Dec. 7, 2016 and incorporated herein by reference.

FIELD

Embodiments of the invention relate to a transducer having an increased back volume characteristic; and more specifically, to a microphone having an acoustically absorbent material for simulated acoustic enlargement of a back volume.

BACKGROUND

In modern consumer electronics, audio capability is playing an increasingly larger role as improvements in digital audio signal processing and audio content delivery continue to happen. There is a range of consumer electronics devices that are not dedicated or specialized audio playback or pick-up devices, yet can benefit from improved audio performance. For instance, portable computing devices such as laptops, notebooks, and tablet computers are ubiquitous, as are portable communications devices such as smart phones. These devices, however, do not have sufficient space to house relatively large microphones or speakers. Thus, microphones and speakers sizes are becoming more and more compact and decreasing in size. Generally, as a microphones decrease in size, the back volume also decreases, which in turn, can potentially impact audio performance, for example, sensitivity, frequency response and signal-to-noise (SNR) ratio.

SUMMARY

In one embodiment, the invention relates to a microphone, for example, a micro-electro-mechanical system (MEMS) microphone, having a back volume chamber with an acoustically absorbent material to simulate an increased back volume size. The increased back volume will allow for improved acoustic performance of the microphone, for example, improved sensitivity, improved frequency response, and/or high SNR. In addition, the acoustically absorbent material may be used to absorb heat within the microphone, and thereby help to limit acoustic distortions caused by temperature change within the microphone.

More specifically, in one embodiment, the invention is directed to a micro-electro-mechanical system (MEMS) microphone assembly. The microphone assembly may have an enclosure including a top side and a bottom side that define a first chamber having a first volume and an acoustic inlet port formed through one of the top side or the bottom side. The assembly may further include a MEMS microphone mounted within the first chamber. The MEMS microphone may include a second chamber having a second volume and a diaphragm having a first side interfacing with the first chamber and a second side interfacing with the second chamber. In addition, an acoustically absorbent material may be within one of the first chamber or the second chamber. The acoustically absorbent material may cause a simulated or virtual acoustic enlargement of the first volume or the second volume. In some embodiments, the acoustic inlet port is formed through the bottom side of the enclosure and is acoustically coupled to the second side of the diaphragm. In this case, the acoustically absorbent material is within the first chamber, and the acoustically absorbent material occupies less than an entire volume of the first volume of the first chamber. In some cases, the acoustically absorbent material is a coating of acoustically absorbent material formed directly on the top side of the enclosure. In other embodiments, the acoustic inlet port is formed through the top side of the enclosure and is acoustically coupled to the first side of the diaphragm. In such embodiments, the acoustically absorbent material is within the second chamber, and the acoustically absorbent material occupies less than an entire volume of the second volume of the second chamber. For example, the acoustically absorbent material is a coating of acoustically absorbent material formed directly on the bottom side of the enclosure. The acoustically absorbent material may cause a simulated acoustic enlargement of the first volume or the second volume by a factor of at least three (3). The acoustically absorbent material may be zeolite. In some embodiments, the assembly may further include an application-specific integrated circuit (ASIC) mounted in the enclosure. The acoustically absorbent material may also be thermally absorbent and formed over the ASIC.

Another embodiment of the invention may include a MEMS microphone assembly having an enclosure with a top side and a bottom side that define an enclosed space and an acoustic inlet port formed through one of the top side or the bottom side. A MEMS microphone may be mounted within the enclosed space. The MEMS microphone may have a diaphragm that divides the enclosed space into a front volume chamber open to the acoustic inlet port and a first side of the diaphragm, and a back volume chamber open to a second side of the diaphragm. The assembly may further include an acoustically absorbent surface coating within the back volume chamber. The acoustically absorbent surface coating may cause a simulated acoustic enlargement of the back volume chamber. In some embodiments, the MEMS microphone may be mounted to the bottom side of the enclosure, and the acoustic inlet port is formed through the bottom side. In further embodiments, the MEMS microphone may be mounted to the bottom side of the enclosure, and the acoustic inlet port is formed through the top side. In some embodiments, the front volume chamber surrounds the back volume chamber. In some embodiments, the simulated acoustic enlargement of the back volume chamber simulates a volume that is at least three times an actual volume of the back volume chamber. The acoustically absorbent surface coating may include zeolite.

Another embodiment of the invention includes a process for manufacturing a micro-electro-mechanical system (MEMS) microphone module. The process may include providing a MEMS microphone having a MEMS microphone enclosure comprising an acoustic port acoustically coupled to a front volume chamber that is coupled to one side of a diaphragm, and a back volume chamber that is coupled to another side of the diaphragm. The process may further include forming a surface coating on a surface of the MEMS microphone enclosure and within the back volume chamber. The surface coating may include an acoustically absorbent material that simulates an acoustic enlargement of the front volume chamber or the back volume chamber in which it is formed. The surface coating may be formed using a screen printing process. The surface coating may be formed using a freeze drying surface deposition process. The acoustically absorbent material may include zeolite.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
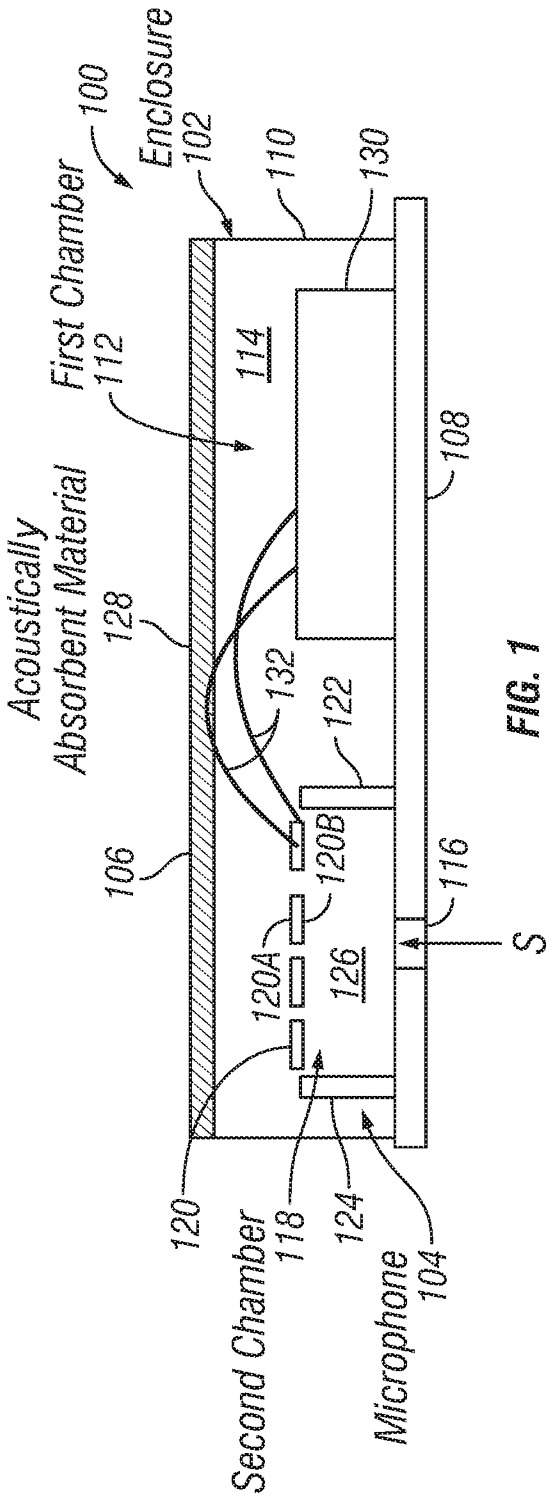
FIG. 1 is a schematic cross-section of one embodiment of a microphone assembly.

FIG. 1 is a schematic cross-section of one embodiment of a microphone assembly. Microphone assembly 100 may be any type of microphone assembly or module that can be used in an electronic device to pick up sound and convert it to an electrical signal. In one embodiment, microphone assembly 100 is a micro-electro-mechanical system (MEMS) microphone assembly having an enclosure 102 within which a microphone 104, such as a MEMS microphone, is positioned. Enclosure 102 may include a top wall or top side 106, a bottom wall or bottom side 108 and a side wall 110 connecting the top side 106 to the bottom side 108. The combination of the top side 106, bottom side 108 and side wall 110 may define a first chamber 112 which encloses a space or first volume 114. Various components of microphone assembly 100 may be positioned within first chamber 112. In this aspect, first volume 114 of first chamber 112 may be considered to be the open area or space surrounding the various components within enclosure 102. In other words, in some embodiments, first volume 114 of first chamber 112 can be less than a total volume of enclosure 102. In some embodiments, one or more of the top side 106, bottom side 108 and/or side wall 110 may be integrally formed with one another as a single unit. In other embodiments, one of the sides may be formed by a substrate having circuitry formed therein (e.g. a printed circuit board). For example, top side 106 and side wall 110 may be one integrally formed structure, for example a lid or cover, that is mounted to a bottom side 108, which is formed by a substrate, to form the enclosed space within which the various components can be positioned.

Figure 2:
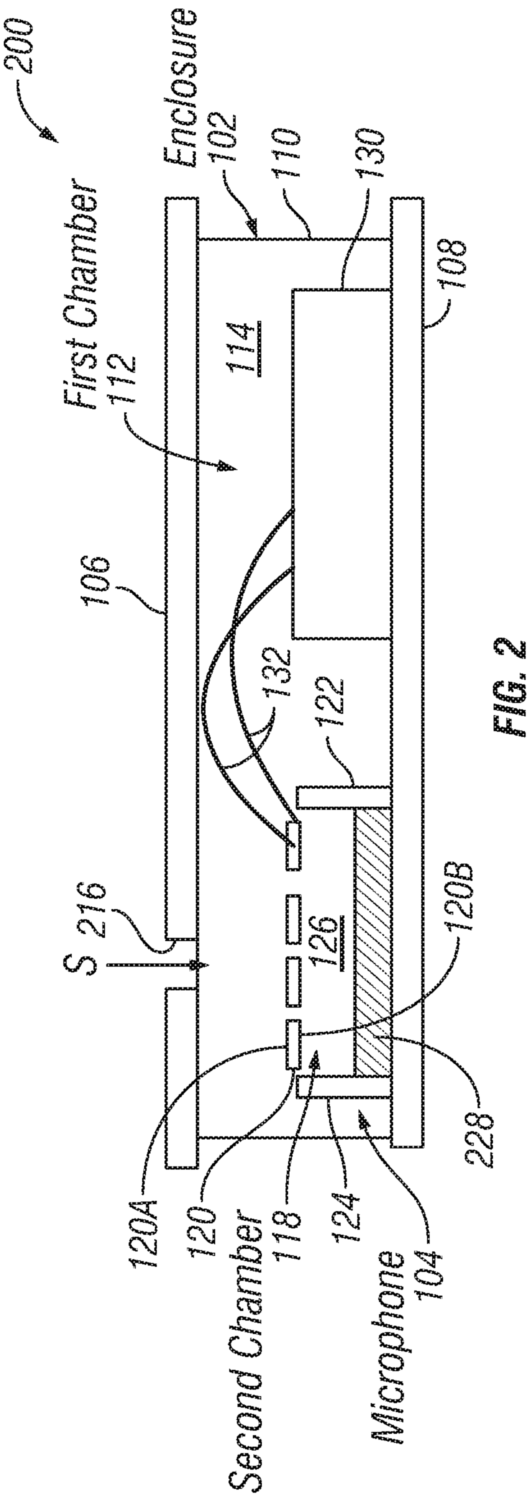
FIG. 2 is a schematic cross-section of another embodiment of a microphone assembly.

Enclosure 102 may further include an acoustic port 116, for example an acoustic or sound inlet or input port, that allows for a sound from the environment surrounding enclosure 102 to be input to microphone 104 within enclosure 102. In FIG. 1, acoustic port 116 is shown formed within bottom side 108 of enclosure 102. Microphone assembly 100 of FIG. 1 may therefore be considered, or referred to herein as, a "bottom port" microphone. In other embodiments, acoustic port 116 may be formed within top side 106 of enclosure 102, as illustrated by FIG. 2. In such embodiments, microphone assembly 100 is considered, or referred to herein as, a "top port" microphone. In still further embodiments, acoustic port 116 may be formed through side wall 110.

Microphone 104 may be positioned within enclosure 102 as shown. For example, microphone 104 may be mounted to bottom side 108 of enclosure 102. As previously discussed, bottom side 108 may be a substrate having circuitry (e.g., a printed circuit board) and microphone 104, or any of its associated components, may be electrically connected to the circuitry. Microphone 104 could be a MEMS microphone as previously mentioned. In other embodiments, microphone 104 may be any type of low profile transducer operable to convert sound into an audio signal, for example, a piezoelectric microphone, a dynamic microphone or an electret microphone. Microphone 104 may include a sound pick-up surface 120 that is suspended within enclosure 102 by support members 122, 124. Sound pick-up surface 120 may be any type of member suitable for operation as a sound pick-up surface for a microphone. For example, sound pick-up surface 120 may be a diaphragm or compliant membrane that is etched into a silicon wafer by MEMS processing techniques.

The combination of sound pick-up surface 120 and support members 122, 124 define a second chamber 118 having a second volume 126. In other words, second chamber 118 is a chamber formed within first chamber 112. Second chamber 118 and second volume 126 may be, in some embodiments, acoustically isolated from first chamber 112 and first volume 114. In such cases, second chamber 118 and first chamber 112 are not open to one another and do not share a same acoustic volume. In other embodiments, sound pick-up surface 120 may include one or more small vent or release ports to, for example, equalize a pressure between a volume on each side. Sound pick-up surface 120 may have a first side 120A that interfaces with, or is considered within, first chamber 112, and a second side 120B that interfaces with, or is otherwise considered within, second chamber 118. In other words, sound pick-up surface 120 can be considered as dividing the space within enclosure 102 into first volume 114 and second volume 126. In some embodiments, second volume 126 may be smaller than first volume 114.

As illustrated in FIG. 1, acoustic port 116 is formed through bottom side 108 of enclosure 102 and is open to second volume 126 defined by second chamber 118. In other words, acoustic port 116 provides an acoustic pathway from the ambient environment outside of enclosure 102 so that sound (S) can travel to second chamber 118, and in turn, be picked up by second side 120B of sound pick-up surface 120. Second volume 126 may therefore be considered, or otherwise referred to herein, as a front volume chamber of microphone 104 because, for example, it is connected to acoustic port 116 and allows for sound (S) as illustrated by the arrow to pass to sound pick-up surface 120.

First volume 114 defined by first chamber 112, in turn, forms a substantially closed air volume around first side 120A of sound pick-up surface 120 and may be considered a back volume chamber of microphone 104. First volume 114 can impact a displacement of sound pick-up surface 120 and can therefore impact an acoustic performance of microphone 104. For example, a displacement of sound pick-up surface 120 in response to a sound input (S) can increase a pressure within first chamber 112. This increase in pressure behind sound pick-up surface 120 can, in turn, reduce a compliance of sound pick-up surface 120. This effect is even more significant as the volume of the chamber behind the sound pick-up surface 120 decreases. These changes in pressure can impact performance characteristics of the microphone such as a sensitivity, signal-to-noise ratio (SNR) and/or frequency response. In order to minimize pressure change, and in turn, improve performance characteristics, it is desirable to maximize the volume of air enclosed within back volume chamber (e.g., first volume 114). This is often challenging, however, in the case of a typical MEMS microphone because it also desirable to maintain a relatively low profile (e.g., a z-height of 1 mm or less), and in turn, compact footprint so the microphone is suitable for use within portable or miniaturized devices.

To address this challenge, a virtual or simulated increase in first volume 114 is accomplished using an acoustically absorbent material 128. In other words, the acoustically absorbent material 128 makes first volume 114 behave, or otherwise have the same effect on an acoustic performance, as a much larger acoustic volume without actually increasing first volume 114 or changing the footprint of first chamber 112. For example, acoustically absorbent material 128 may cause first volume 114 or first chamber 112 to behave similar to a back volume or back volume chamber that is 10 percent, 20 percent or infinitely larger. In another embodiment, acoustically absorbent material 128 causes first volume 114 to behave as if it were at least twice the actual size, three times the actual size, four times the actual size, or more. In other words, the simulated acoustic enlargement of first volume 114 is by a factor of at least two, at least three, at least four, or more than four. More specifically, in one embodiment, the actual acoustic volume of first volume 114 may be about 1.5 $mm^3$ or less, but with acoustically absorbent material 128, it simulates an acoustic volume of around 2 $mm^3$ or more. This, in turn, can result in microphone 104 having an improved sensitivity, SNR and/or frequency response.

Acoustically absorbent material 128 is positioned within first chamber 112 such that it occupies a portion of first volume 114. Representatively, in one embodiment, acoustically absorbent material 128 is a layer of acoustically absorbent material formed on an inner surface of top side 106 of enclosure 102. In some cases, acoustically absorbent material 128 may also be formed along the inner surface of side wall 110 if desired. Acoustically absorbent material 128 may not, however, occupy an entire volume of first volume 114. Rather, acoustically absorbent material 128 is a relatively thin layer, for example, a surface coating, formed directly on top side 106 of side wall 110. For example, acoustically absorbent material 128 may be formed on top side 106 by forming a liquid solution including the acoustically absorbent material and using a screen printing process or a freeze drying surface deposition process to apply the solution. The acoustically absorbent material 128 could be a conformal coating have a same thickness throughout, or a non-conformal coating having different thicknesses or a pattern.

In some embodiments, the acoustically absorbent material 128 is any type of material capable of absorbing energy associate with sound waves. For example, acoustically absorbent material 128 may be a porous material or collection of particles that, when applied to a surface, form a porous structure, such as a layer or coating. Representatively, in one embodiment, the acoustically absorbent material may be zeolite, or any other similar combination of minerals capable of absorbing an acoustic energy. In addition, in some cases, the acoustically absorbent material may also absorb a thermal energy as discussed in reference to FIG. 4.

In some embodiments, microphone assembly 100 may further include an application-specific integrated circuit (ASIC) 130 positioned within enclosure 102. ASIC 130 may be mounted to bottom side 108 of enclosure 102. ASIC 130 may be electrically connected to microphone 104 by wires 132. For example, ASIC 130 may be used for signal conditioning and/or processing of signals output by microphone 104.

FIG. 2 is a schematic cross-section of another embodiment of a microphone assembly. Microphone assembly 200 is substantially similar to microphone assembly 100 and includes similar features that will therefore not be repeated here. In this embodiment, however, a sound inlet port 216 is formed through top side 106 of enclosure 102. In other words, sound (S) travels through sound inlet port 216 to first chamber 112 and first volume 114 instead of second chamber 118. Rather, second chamber 118 forms a substantially sealed second volume 126 around the second side 120B of sound pick-up surface 120. In this embodiment, first volume 114 may therefore be considered a front volume and first chamber 112 a front volume chamber, while second volume 126 is considered the back volume and second chamber 118 the back volume chamber.

In addition, as can be seen from this embodiment, second volume 126 (e.g., the back volume) is relatively small in comparison to first volume 114. Therefore, even a relatively small pressure change within second volume 126, can have a significant impact on the performance of microphone 104. It is therefore even more critical in this embodiment, to simulate a larger back volume. In this aspect, acoustically absorbent material 228 is used to provide a virtual or simulated enhancement of second volume 126. In particular, as can be seen from FIG. 2, acoustically absorbent material 228 is positioned within second chamber 118. For example, acoustically absorbent material 228 may be formed as a layer over the inner surface of bottom side 108 that forms the bottom portion of second chamber 118. Similar to acoustically absorbent material 128 described in reference to FIG. 1, acoustically absorbent material 228 is a layer or coating that occupies less than an entire volume of second volume 126 and which is operable to simulate an enhanced acoustic volume. For example, acoustically absorbent material 228 may cause second volume 126 to seem as though it has an acoustic volume two times, three times, four times or more, as large as the actual volume. For example, in one embodiment, an actual acoustic volume of second volume 126 may be around 0.3 $mm^3$, however, with acoustically absorbent material, it simulates or otherwise behaves as if it had a volume of about 1 $mm^3$ or more.

Acoustically absorbent material 228 may be the same material and/or have similar properties as acoustically absorbent material 128 described in reference to FIG. 1. For example, in some embodiments, acoustically absorbent material 228 is any type of material capable of absorbing energy associate with sound waves. For example, acoustically absorbent material 228 may be a porous material or particles that when applied form a porous structure. Representatively, in one embodiment, the acoustically absorbent material may be zeolite.

The remaining features of FIG. 2 have already been discussed in detail in reference to FIG. 1 and will therefore not be repeated herein.

Figure 3:
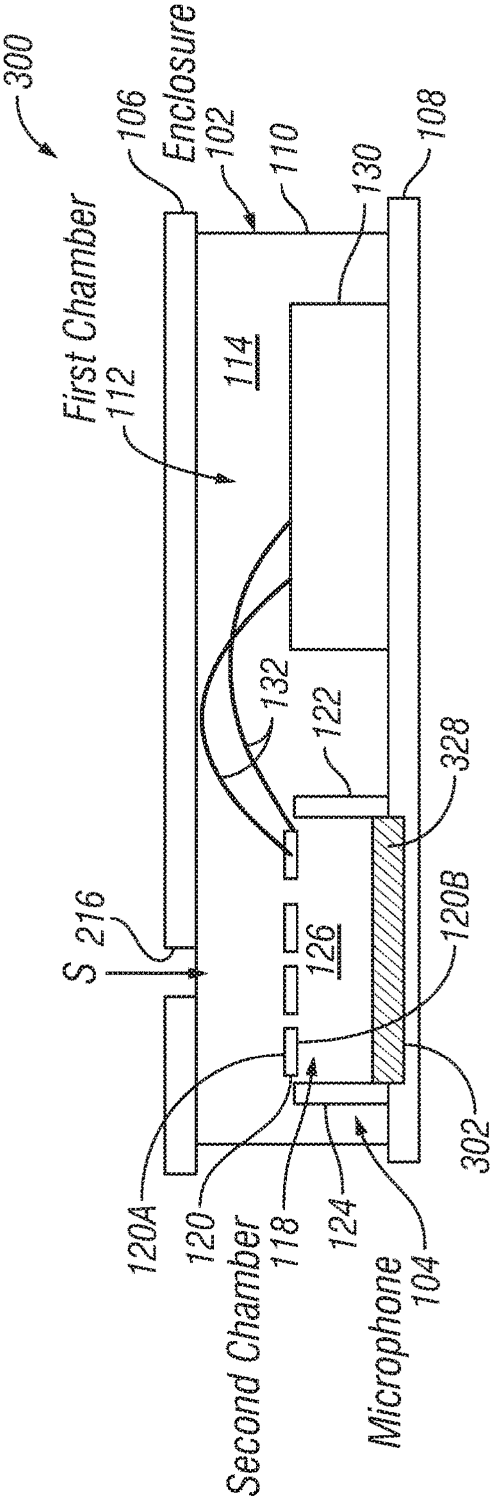
FIG. 3 is a schematic cross-section of another embodiment of a microphone assembly.

FIG. 3 is a schematic cross-section of another embodiment of a microphone assembly. Microphone assembly 300 is substantially similar to microphone assembly 200 and includes similar features that will therefore not be repeated here. In this embodiment, however, acoustically absorbent material 328 (which is similar to material 128 and 228 previously discussed) is formed within a cavity 302 formed within second chamber 118. In particular, cavity 302 may be a recessed region formed within an inner surface of bottom side 108 of enclosure 102, which forms the bottom side of microphone 104. For example, acoustically absorbent material 328 may be formed as a layer within cavity 302. Similar to acoustically absorbent material 228 described in reference to FIG. 2, acoustically absorbent material 328 is a layer or coating that occupies less than an entire volume of second volume 126 and which is operable to simulate an enhanced acoustic volume. For example, acoustically absorbent material 328 may cause second volume 126 to seem as though it has an acoustic volume two times, three times, four times or more, as large as the actual volume. For example, in one embodiment, an actual acoustic volume of second volume 126 may be around 0.3 $mm^3$, however, with acoustically absorbent material, it simulates or otherwise behaves as if it had a volume of about 1 $mm^3$ or more.

Acoustically absorbent material 328 may be the same material and/or have similar properties as acoustically absorbent material 128 described in reference to FIG. 1. For example, in some embodiments, acoustically absorbent material 328 is any type of material capable of absorbing energy associate with sound waves. For example, acoustically absorbent material 328 may be a porous material or particles that when applied form a porous structure. Representatively, in one embodiment, the acoustically absorbent material may be zeolite.

The remaining features of FIG. 3 have already been discussed in detail in reference to FIG. 1 and FIG. 2 and will therefore not be repeated herein.

Figure 4:
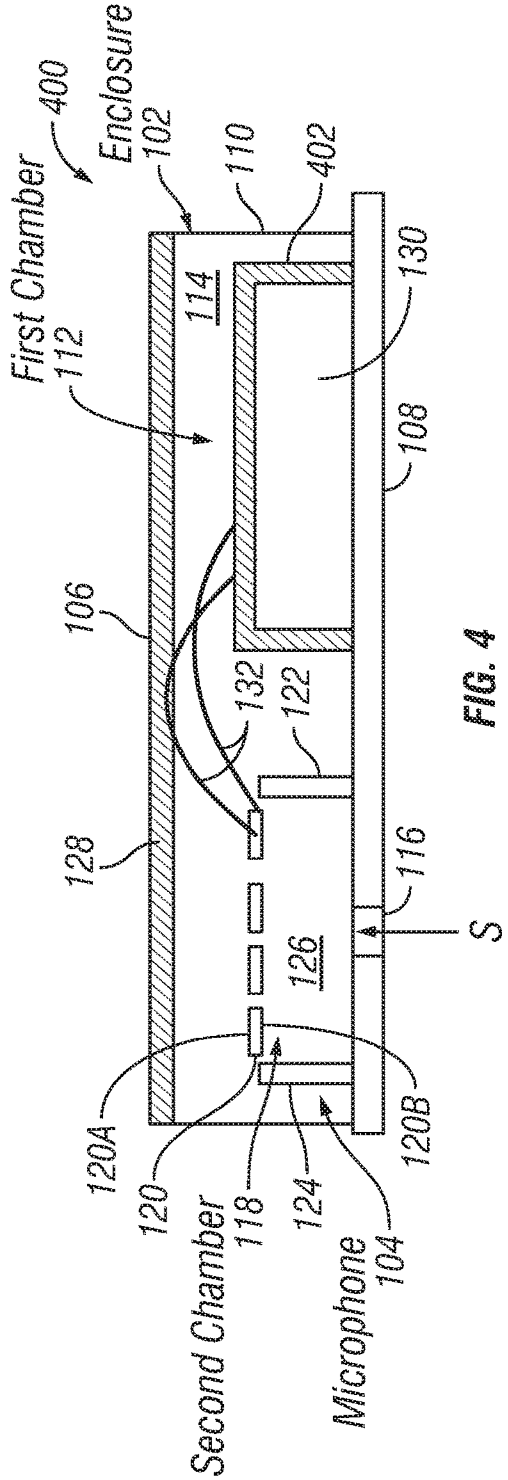
FIG. 4 is a schematic cross-section of another embodiment of a microphone assembly.

FIG. 4 is a schematic cross-section of another embodiment of a microphone assembly. Microphone assembly 400 is substantially similar to microphone assembly 100 and includes similar features that will therefore not be repeated here. In this embodiment, however, another layer of acoustically absorbent material 402 is formed over ASIC 130 and portions of associated wires 132. In particular, it has been found that due to the relatively small volume within microphone enclosure 102 (e.g. 1.5 $mm^3$ or less), even temperature changes within the enclosure as small as 0.5 millikelvin can move the air inside the microphone and be picked up as sound. Temperature changes may occur due to, for example, radio-frequency (RF) interference that can result in heat output within microphone 104. Acoustically absorbent material 402, which may also be thermally absorbent, can be used to reduce these transient temperature changes, thereby eliminating or reducing the pick up of these undesirable sounds. In particular, acoustically absorbent material 402 positioned over ASIC 130 and portions of wire 132, and therefore within first chamber 112, absorbs the thermal output, and in turn, minimizes temperature changes which can distort microphone performance.

Acoustically absorbent material 402 may be the same material and/or have similar properties as acoustically absorbent material 128 described in reference to FIG. 1. For example, in some embodiments, acoustically absorbent material 402 is any type of material capable of absorbing energy associate with sound waves. For example, acoustically absorbent material 402 may be a porous material or particles that when applied form a porous structure. Representatively, in one embodiment, the acoustically absorbent material may be zeolite.

The remaining features of FIG. 4 have already been discussed in detail in reference to FIG. 1 and will therefore not be repeated herein.

Figure 5:
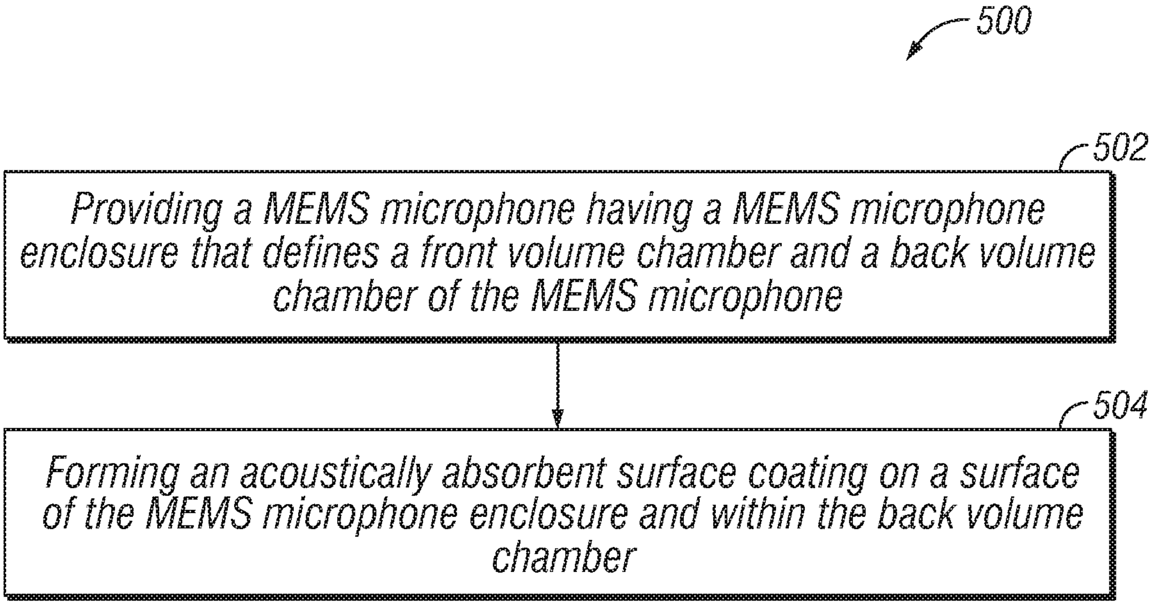
FIG. 5 illustrates a block diagram of one embodiment of a method of manufacturing a microphone assembly.

FIG. 5 illustrates one embodiment of a process for manufacturing a microphone. Representatively, in one embodiment, process 500 includes providing a MEMS microphone having a MEMS microphone enclosure that defines a front volume chamber and a back volume chamber of the MEMS microphone as illustrated by block 502. The MEMS microphone may be, for example, microphone 104 previously discussed in reference to FIG. 1. Process 500 may further include forming a surface coating on a surface of the MEMS microphone enclosure and within the back volume chamber as illustrated by block 502. The surface coating may be an acoustically absorbent material (e.g., zeolite) that causes a simulated acoustic enlargement of the front volume chamber or the back volume chamber in which it is formed as previously discussed. In one embodiment, the surface coating is formed using a screen printing process. In another embodiment, the surface coating is formed using a freeze drying surface deposition process.

Figure 6:
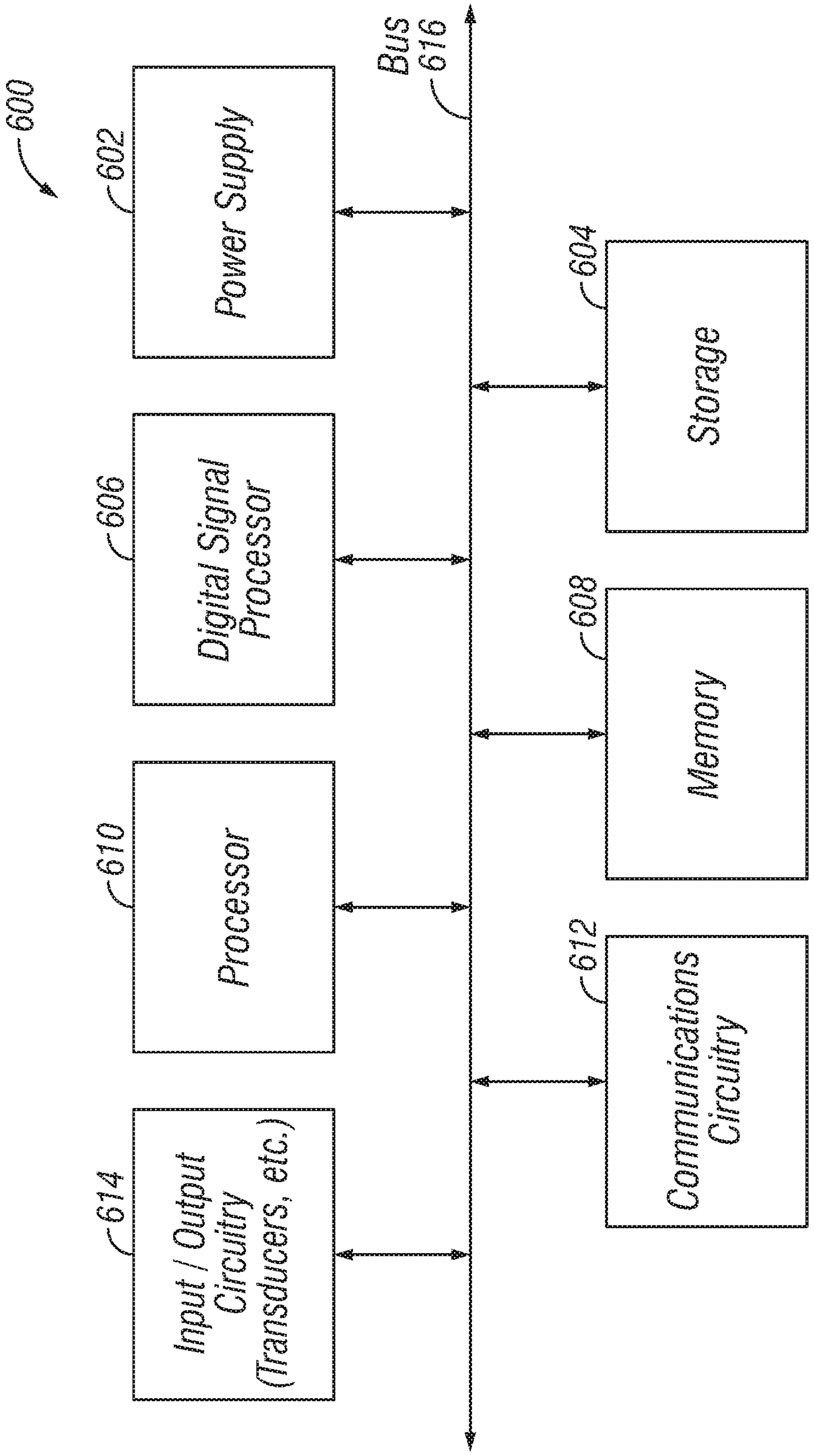
FIG. 6 illustrates a block diagram of some of the constituent components of an embodiment of an electronic device in which an embodiment of the invention may be implemented.

FIG. 6 illustrates a simplified schematic view of one embodiment of an electronic device in which a microphone as described herein may be implemented. For example, a portable electronic device is an example of a system that can include some or all of the circuitry illustrated by electronic device 600.

Electronic device 600 can include, for example, power supply 602, storage 604, signal processor 606, memory 608, processor 610, communication circuitry 612, and input/output circuitry 614. In some embodiments, electronic device 600 can include more than one of each component of circuitry, but for the sake of simplicity, only one of each is shown in FIG. 6. In addition, one skilled in the art would appreciate that the functionality of certain components can be combined or omitted and that additional or less components, which are not shown in FIGS. 1-5, can be included in, for example, the portable device.

Power supply 602 can provide power to the components of electronic device 600. In some embodiments, power supply 602 can be coupled to a power grid such as, for example, a wall outlet. In some embodiments, power supply 602 can include one or more batteries for providing power to an ear cup, headphone or other type of electronic device associated with the headphone. As another example, power supply 602 can be configured to generate power from a natural source (e.g., solar power using solar cells).

Storage 604 can include, for example, a hard-drive, flash memory, cache, ROM, and/or RAM. Additionally, storage 604 can be local to and/or remote from electronic device 600. For example, storage 604 can include integrated storage medium, removable storage medium, storage space on a remote server, wireless storage medium, or any combination thereof. Furthermore, storage 604 can store data such as, for example, system data, user profile data, and any other relevant data.

Signal processor 606 can be, for example a digital signal processor, used for real-time processing of digital signals that are converted from analog signals by, for example, input/output circuitry 614. After processing of the digital signals has been completed, the digital signals could then be converted back into analog signals.

Memory 608 can include any form of temporary memory such as RAM, buffers, and/or cache. Memory 608 can also be used for storing data used to operate electronic device applications (e.g., operation system instructions).

In addition to signal processor 606, electronic device 600 can additionally contain general processor 610. Processor 610 can be capable of interpreting system instructions and processing data. For example, processor 610 can be capable of executing instructions or programs such as system applications, firmware applications, and/or any other application. Additionally, processor 610 has the capability to execute instructions in order to communicate with any or all of the components of electronic device 600. For example, processor 610 can execute instructions stored in memory 608 to enable or disable ANC.

Communication circuitry 612 may be any suitable communications circuitry operative to initiate a communications request, connect to a communications network, and/or to transmit communications data to one or more servers or devices within the communications network. For example, communications circuitry 612 may support one or more of Wi-Fi (e.g., a 802.11 protocol), Bluetooth®, high frequency systems, infrared, GSM, GSM plus EDGE, CDMA, or any other communication protocol and/or any combination thereof.

Input/output circuitry 614 can convert (and encode/decode, if necessary) analog signals and other signals (e.g., physical contact inputs, physical movements, analog audio signals, etc.) into digital data. Input/output circuitry 614 can also convert digital data into any other type of signal. The digital data can be provided to and received from processor 610, storage 604, memory 608, signal processor 606, or any other component of electronic device 600. Input/output circuitry 614 can be used to interface with any suitable input or output devices, such as, for example, microphone 104 of FIGS. 1-4. Furthermore, electronic device 600 can include specialized input circuitry associated with input devices such as, for example, one or more proximity sensors, accelerometers, etc. Electronic device 600 can also include specialized output circuitry associated with output devices such as, for example, one or more speakers, earphones, etc.

Lastly, bus 616 can provide a data transfer path for transferring data to, from, or between processor 610, storage 604, memory 608, communications circuitry 612, and any other component included in electronic device 600. Although bus 616 is illustrated as a single component in FIG. 6, one skilled in the art would appreciate that electronic device 600 may include one or more components.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A micro-electro-mechanical system (MEMS) microphone assembly comprising:

an enclosure having a top side and a bottom side that is opposite the top side, wherein the top side and the bottom side define a first chamber having a first volume, and an acoustic inlet port is formed through the bottom side;

a MEMS microphone mounted within the first chamber, the MEMS microphone defining a second chamber having a second volume and a diaphragm having a first side interfacing with the first chamber and a second side interfacing with the second chamber;

an application-specific integrated circuit (ASIC) mounted in the enclosure and electrically connected to the MEMS microphone by a wire; and an acoustically and thermally absorbent material layer comprising zeolite, wherein the acoustically absorbent material layer is within the first chamber and on an inner surface of a portion of the top side that is opposite the acoustic inlet port, and wherein the acoustically and thermally absorbent material layer is formed over the ASIC and a portion of the wire.

2. The MEMS microphone assembly of claim 1 wherein the acoustic inlet port is acoustically coupled to the second side of the diaphragm.

3. The MEMS microphone assembly of claim 1 wherein the acoustically and thermally absorbent material layer is on an inner surface of a side wall that connects the top side to the bottom side and occupies less than an entire volume of the first volume of the first chamber.

4. The MEMS microphone assembly of claim 1 wherein the acoustically and thermally absorbent material layer is a coating of zeolite formed directly on the top side of the enclosure.

5. The MEMS microphone assembly of claim 1 wherein the acoustically and thermally absorbent material layer causes a simulated acoustic enlargement of the first volume or the second volume by a factor of at least 3.

6. A micro-electro-mechanical system (MEMS) microphone assembly comprising:

an enclosure having a top side and a bottom side, and an acoustic inlet port formed through the bottom side;

a MEMS microphone mounted within the enclosure, the MEMS microphone having a diaphragm that divides the enclosure into a front volume chamber open to the acoustic inlet port and a first side of the diaphragm, and a back volume chamber that is open to a second side of the diaphragm;

an application-specific integrated circuit (ASIC) mounted within the back volume chamber of the enclosure and electrically connected to the MEMS microphone by a wire; and an acoustically and thermally absorbent surface coating formed within the back volume chamber, the acoustically and thermally absorbent surface coating is exposed to the second side of the diaphragm and formed over the ASIC and a portion of the wire, and wherein the acoustically and thermally absorbent surface coating causes a simulated acoustic enlargement of the back volume chamber and minimizes temperature changes within the enclosure.

7. The MEMS microphone assembly of claim 6 wherein the MEMS microphone is mounted to the bottom side of the enclosure, and the acoustic inlet port is formed through the bottom side.

8. The MEMS microphone assembly of claim 6 wherein the MEMS microphone is mounted to the bottom side of the enclosure, and the acoustic inlet port is formed through the top side.

9. The MEMS microphone assembly of claim 6 wherein the front volume chamber surrounds the back volume chamber.

10. The MEMS microphone assembly of claim 6 wherein the simulated acoustic enlargement of the back volume chamber simulates a volume that is at least three times an actual volume of the back volume chamber.

11. The MEMS microphone assembly of claim 6 wherein the acoustically absorbent surface coating comprises zeolite.

12. A method of manufacturing a micro-electro-mechanical system (MEMS) microphone module, the method comprising:

providing a MEMS microphone enclosure having a top side and a bottom side that is opposite the top side, wherein the top side and the bottom side define a first chamber having a first volume, and an acoustic inlet port is formed through the bottom side, a MEMS microphone mounted within the first chamber, the MEMS microphone defining a second chamber having a second volume and a diaphragm having a first side interfacing with the first chamber and a second side interfacing with the second chamber, and an application-specific integrated circuit (ASIC) mounted in the MEMS microphone enclosure and electrically connected to the MEMS microphone by a wire; and forming a surface coating within the first chamber and on an inner surface of a portion of the top side that is opposite the acoustic inlet port, the ASIC and a portion of the wire, wherein the surface coating is an acoustically and thermally absorbent material comprising zeolite, and the surface coating is exposed to the first side of the diaphragm and simulates an acoustic enlargement of the first chamber.

13. The method of claim 12 wherein the surface coating is formed using a screen printing process.

14. The method of claim 12 wherein the surface coating is formed using a freeze drying surface deposition process.

* * * * *